March 16, 1965  W. A. BYRD  3,173,236
GRAIN HARVESTER
Filed April 22, 1963  2 Sheets-Sheet 1
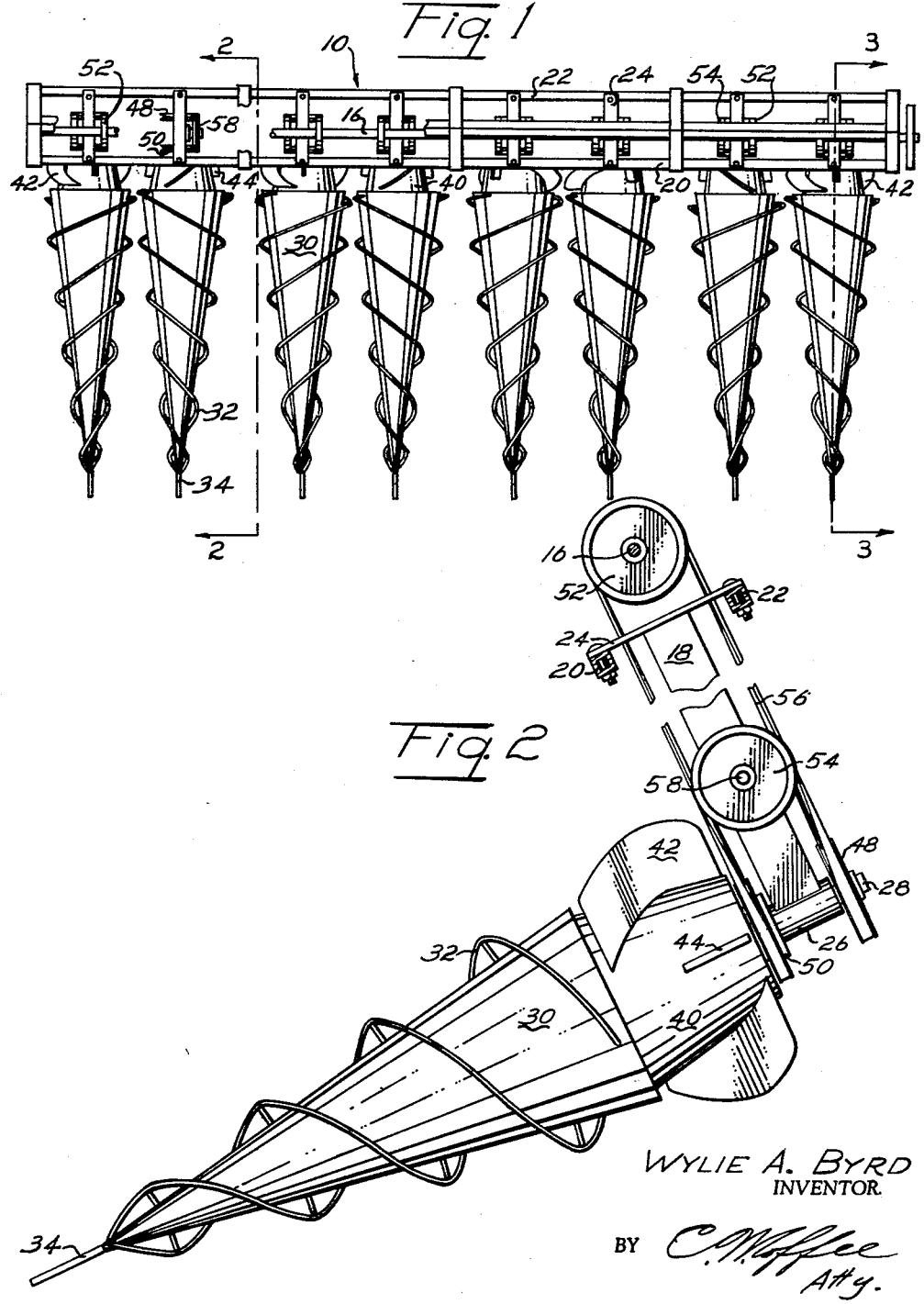
WYLIE A. BYRD
INVENTOR.

March 16, 1965   W. A. BYRD   3,173,236
GRAIN HARVESTER
Filed April 22, 1963   2 Sheets-Sheet 2
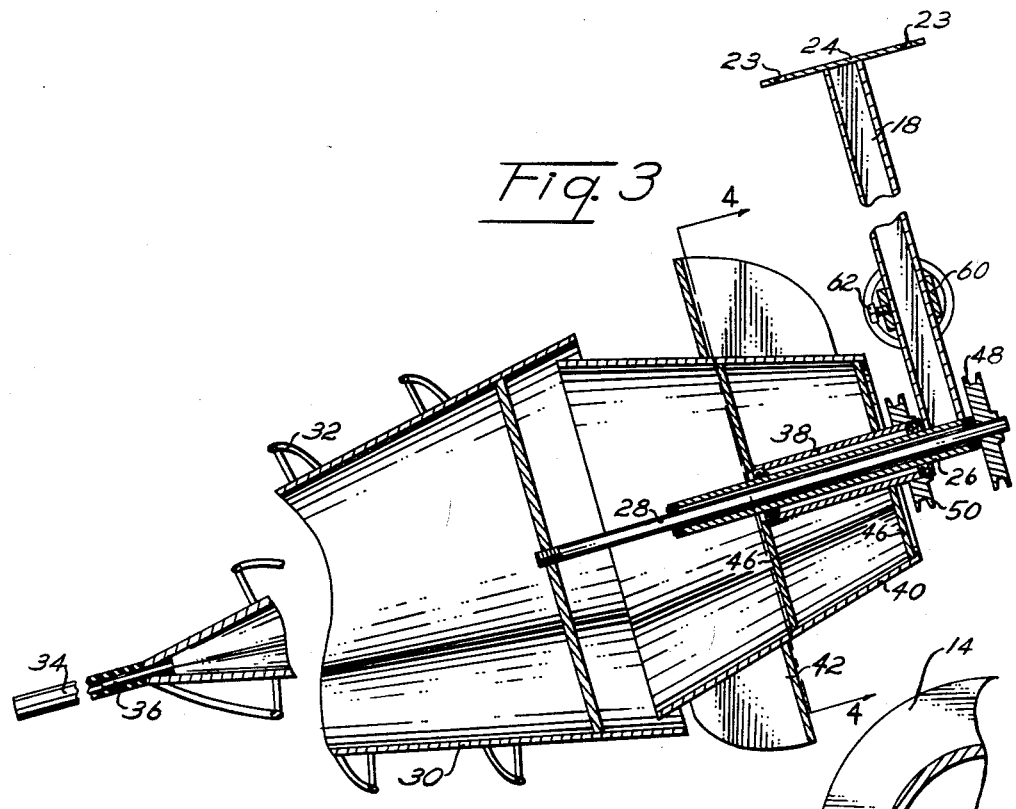
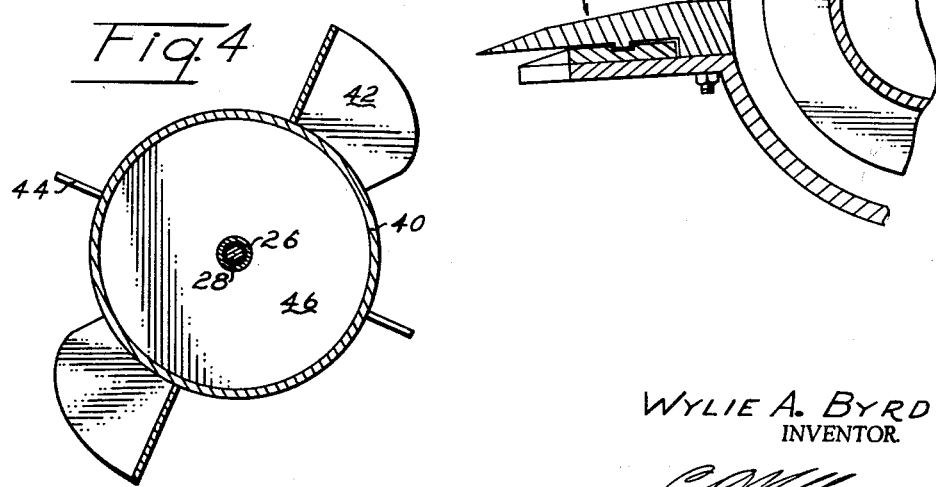
WYLIE A. BYRD
INVENTOR.
BY
Atty.

United States Patent Office 3,173,236
Patented Mar. 16, 1965

3,173,236
GRAIN HARVESTER
Wylie A. Byrd, Rte. 2, Tulia, Tex.
Filed Apr. 22, 1963, Ser. No. 274,531
1 Claim. (Cl. 56—119)

This invention relates to agricultural harvesting implements and more particularly to an agricultural machine for harvesting grain and similar crops.

The invention as shown in this application is an improvement of my earlier application, which was filed on September 16, 1960, Serial No. 56,539, now Patent No. 3,107,474; itself a continuation-in-part of my application filed April 1, 1958, Serial No. 726,580, which is now abandoned. The previous patent application, as this one, dealt with the problem of harvesting grain which is on stalks which have been blown down by the wind or other adverse weather conditions. Both devices are also adaptable for harvesting low vine crops like beans and peas.

This invention like the invention of the previous patent application deals with a machine which will exert a gentle lifting action upon the crop by replacing the reel with a pair of rotating cones, one cone on either side of the row. Spiral ribs extend from the surface of the cone.

Experience has shown need for improving the machine. Desirable improvements include a simplified drive mechanism for driving the cones and rollers which are associated therewith; for a flexible tip to be applied to the apex of the cone; and for improved roller fins to better thrust the severed stalks back on the conveying mechanism after it has been cut by the sickle mechanism.

An object of this invention is to harvest crops which are not vertically orientated.

Another object of this invention is gently to lift growing crops.

Another object of this invention is to provide a machine which will lift crops to cut the stalks wherein the crops are lying close to the ground.

A further object is to provide an improved drive mechanism for the parts of such a machine.

A further object is to provide a better means for insuring the harvested crops are caught by the conveying mechanism of the machine.

A still further object is to provide an improved means for making sure that the crop is lifted even if it is lying on the ground.

Still further objects are to achieve the above with a device that is sturdy, compact, durable, simple, versatile, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a plan view of one embodiment of this invention, showing the attachment disconnected from the machine.

FIG. 2 is a side-elevational view of one roller-cone assembly particularly illustrating the drive mechanism.

FIG. 3 is an axial sectional view of one roller-cone assembly showing the cutting and conveying mechanism of the harvesting equipment, taken on lnie 3—3 of FIG. 1.

FIG. 4 is a cross-sectional view of the roller particularly illustrating the fins thereon, taken on line 4—4 of FIG. 3.

As may be seen in the accompanying drawings one embodiment of this invention is built upon frame 10 which is made to fit upon a combine.

A combine will include cutting means in the form of a sickle bar 12 for cutting stalks and means 14 for conveying the cut stalks to other parts of the combine. Shaft 16 is mounted for rotation upon the frame 10. This shaft 16 is rotated from conventional elements on the combine which are not illustrated in the drawings but which are well known in the art and which will be well understood by those skilled in the art. The shaft 16 is mounted to the frame 10 by suitable bearings.

Pendants 18 depend from longitudinally extending bars 20 and 22 of the frame 10. The bars 20 and 22 extend parallel to the shaft 16 at a lower elevation than the shaft and on either side thereof. The attachment of the pendant 18 to the bars includes cross-member 24 which is attached by bolts extending through the cross-member 24 and through the respective bars 20 and 22. The cross-members 24 are attached to the bars 20 and 22 by bolts which extend through elongated slots 23 in the cross-member 24 and elongated slots in the bars 20 and 22 so that adjustment is possible. Tube 26 is attached to the bottom of the pendant 18 by welding or other convenient, conventional means. Cone shaft 28 is journalled for rotation within the tube 26 by suitable bearings. Cone 30 is attached to cone shaft 28 by a threaded connection. The cone 30 extends forward of the sickle bar 12 and angles downward. The cone 30 is coaxial with the tube 26. Spiral element 32 is attached to the outside of the cone 30. The spiral element 32 on adjacent cones angle around the cone in opposite directions. Each cone has a flexible finger 34 at the apex thereof coaxial with the cone 30. This flexible finger is in the form of a rubber tube which is telescoped over short rod 36 which extends from the cone as may be seen in FIG. 3.

Tube 38 is journalled for rotation about the outside of tube 26 by bearings. Roller 40 is attached to the tube 38 by welding or other convenient, conventional means. The outside of the roller 40 is frusto-conical in shape and the base of the roller 40 is at the base of the cone 30. The base of the cone 30 overlays the base of the roller 40, i.e. the roller 40 is telescoped within the cone 30. The base of the roller 40 is slightly within the base of the cone 30 so that the cut crop does not tend to collect at this point. Two angle fins or spiral elements 42 are attached to the exterior of the roller 40. The fins 42 angle around the roller 40 in opposite directions than the spiral elements 32 of the associated cone. Stated otherwise the spiral elements 42 have opposite pitch than spiral elements 32 of the corresponding cone. The purpose of the fins 42 is to move the cut stalks rearwardly and downwardly upon means for conveying 14 after they have been severed by the sickle bar 12.

Additional straight fins 44 are provided at the rear portion of each roller 40. These fins 44 extend approximately one-half of the length of the roller 40 and therefore extend along the roller one-half of the length that fins 42 do inasmuch as fins 42 extend the entire length of the roller 40. Furthermore the fins 44 extend from the roller approximately one-half the distance the fins 42 do. Specifically I have had good success having the fins 42 extend three inches from the surface of the roller 40 whereas fins 44 extend one and one-half inches from the surface of the roller 40. The fins 44 lie in a plane which contains the axis of the roller 40. There are two of the straight fins 44 each lying half-way between the spiral elements 42. The frustro-conical surface of the roller 40 is supported by a pair of bulkheads 46 which interconnect the surface to the tube 38.

The roller 40 is coaxial with the tube 26 and therefore coaxial with the associated cone 30. The fins 42 of each roller 40 angle around the roller 40 in a direction opposite from the fins 42 of the adjacent roller 40.

Each coaxial cone 30 and roller 40 together form a crop-positioning assembly which is in front of the sickle bar 12. When in use the apex of the cone 30 is near the ground and the flexible finger 34 may run on the ground.

Inasmuch as it is flexible, contact with the ground will not tend to dig into the ground and therefore will not cause damage to the cone 30. As may be seen the roller 40 is positioned above the sickle bar 12.

The rear end of each shaft 28 has sheave 48 attached thereto. Sheave 50 is attached to the rear of each tube 38. The sheaves 48 and 50 are of the same diameter.

For each crop-positioning assembly a sheave 52 is mounted upon shaft 16. An idler pulley 54 is mounted upon each pendant 18. The sheave 52 is aligned with one edge of the sheaves 48 and 50, while the idler pulley 54 is aligned with the other edge. The axis of rotation of the idler pulley 54 is parallel to the shaft 16. A V-belt 56 is trained over each sheave 52, around sheave 48, over idler pulley 54, around sheave 50, and back to sheave 52. In this manner it may be seen that a simple drive means has been provided whereas the roller 40 and cone 30 are driven in opposite directions at the same angular velocity. Each cone 30 is driven in an opposite direction than the adjacent cone by the simple expedient of placing the sheave 52 on the other side of the assembly. For example, looking at FIG. 1 on the two right assemblies, it will be noted that the sheave 52 on the right assembly is mounted to the left of the pendant 18, whereas on the adjacent assembly the sheave 52 is mounted to the right of the pendant 18.

The idler pulley 54 is mounted upon stub shaft 58 which is attached to sleeve 60 which surrounds the pendant 18. The position of the sleeve 60 on the pendant 18 is adjusted by set screws 62. By raising or lowering the sleeve 60, the tension of the belt 56 is adjusted.

It will be apparent that the embodiment shown is only exemplary and that various modifications can be made in construction, materials, and arrangement within the scope of the invention as defined in the appended claim.

I claim as my invention:

In a harvester machine having a crop-lifting and positioning assembly to facilitate cutting including,
 (a) a harvester with a horizontally extending cutting means,
 (b) a support frame mounted on said harvester,
 (c) said frame supporting a plurality of paired crop-positioning assemblies in front of said cutting means,
 (d) each assembly comprising a coaxially mounted conical member and a roller member,
 (e) the conical member having its apex position adjacent the ground,
 (f) the roller member being positioned rearwardly of the base of the conical member,
 (g) said roller member being positioned above the cutting means,
 (h) driving means on said frame for driving said crop-positioning assemblies,
 (i) one conical member of each paired assembly being driven in one direction and the corresponding roller member being driven in the opposite direction,
 (j) the cooperative crop-positioning assemblies of each pair having opposite directions of rotation, and
 (k) said conical members having a spiral element thereon; the improvement comprising:
 (l) said driving means including a shaft mounted for rotation upon said frame,
 (m) a sheave mounted on said shaft for each of said crop-positioning assemblies,
 (n) a sheave attached to each conical member,
 (o) a sheave attached to each roller member,
 (p) an idler pulley for each assembly adjustably mounted on said frame,
 (q) the axis of rotation of the idler pulley being parallel to the shaft which is normal to the axis of said assembly,
 (r) a belt trained from each of the sheaves on the shaft around the sheave attached to the conical member, around the idler pulley, around the sheave attached to the roller member and back to the sheave mounted on the shaft; and
 (s) wherein each of said roller members has a spiral element which is of opposite pitch from its corresponding conical member,
 (t) each roller member in addition has a straight fin which lies in a plane which contains the axis of the roller member, and
 (u) wherein each conical member has a flexible finger extending from the apex coaxial therewith and attached thereto.

References Cited by the Examiner
UNITED STATES PATENTS 2,927,414   3/60   Jones _____ 56—104
3,107,474  10/63   Byrd _____ 56—119

T. GRAHAM CRAVER, *Primary Examiner.*

ANTONIO F. GUIDA, ARNOLD RUEGG, *Examiners.*